United States Patent
Mitchell et al.

(10) Patent No.: US 7,324,212 B2
(45) Date of Patent: Jan. 29, 2008

(54) OPTICAL ENCODER HAVING SLANTED OPTICAL DETECTOR ELEMENTS FOR HARMONIC SUPPRESSION

(75) Inventors: Donald K. Mitchell, Wayland, MA (US); William G. Thorburn, Whitinsville, MA (US)

(73) Assignee: GSI Group Corporation, Billerica, MA (US)

( * ) Notice: Subject to any disclaimer, the term of this patent is extended or adjusted under 35 U.S.C. 154(b) by 0 days.

(21) Appl. No.: 11/712,068

(22) Filed: Feb. 28, 2007

(65) Prior Publication Data

US 2007/0153292 A1 Jul. 5, 2007

Related U.S. Application Data

(63) Continuation of application No. 11/189,551, filed on Jul. 26, 2005, now abandoned.

(51) Int. Cl.
*G01B 11/02* (2006.01)
*G01B 9/02* (2006.01)
*G01D 5/36* (2006.01)

(52) U.S. Cl. .................. 356/499; 356/521; 250/237 G (58) Field of Classification Search ............... 356/521, 356/488, 494, 499; 250/231.13, 231.14, 250/231.15, 231.16, 237 G
See application file for complete search history.

(56) References Cited

U.S. PATENT DOCUMENTS

| 4,595,991 A | 6/1986 | Spies |
| 4,782,229 A | 11/1988 | Ernst |
| 5,486,923 A | 1/1996 | Mitchell et al. |
| 5,530,543 A | 6/1996 | Hercher |
| 5,559,600 A | 9/1996 | Mitchell |

(Continued)

FOREIGN PATENT DOCUMENTS

DE 3616144 11/1987

(Continued)

OTHER PUBLICATIONS

De Groot, Peter, "Derivation of algorithms for phase-shifting interferometry using the concept of a data-sampling window" Applied Optics, vol. 34, No. 22, pp. 4723-4730 (1995).

*Primary Examiner*—Patrick Connolly
(74) *Attorney, Agent, or Firm*—BainwoodHuang (57) ABSTRACT

An optical encoder includes a source of a light beam, an optical grating that generates a spatial pattern of interference fringes, and an optical detector which includes generally elongated detector elements that sample the interference fringe pattern at spatially separated locations along the direction of motion of the grating. Each detector element has one or more segments slanted along the direction of motion of the grating by an integer multiple of the period of an undesirable harmonic component of the fringe pattern, thereby spatially integrating the harmonic component and suppressing its contribution to an output of the detector. One specific detector type includes parallel elongated rectangular elements in a rectangular array that is rotated slightly about a Z axis; another type includes detector elements arranged to form a non-rectangular parallelogram. Another type of detector includes detector elements that each have multiple elongated rectangular segments which may be arranged into two non-parallel sets. The two sets can be further arranged in an alternating fashion so as to impart a zig-zag or chevron shape to each detector element.

24 Claims, 5 Drawing Sheets

U.S. PATENT DOCUMENTS

| | | |
|---|---|---|
| 5,604,345 A | 2/1997 | Matsuura |
| 5,646,730 A | 7/1997 | Mitchell et al. |
| 5,814,812 A | 9/1998 | Holzapfel |
| 5,874,729 A | 2/1999 | Holzapfel |
| 5,889,280 A | 3/1999 | Matsuura |
| 5,981,942 A | 11/1999 | Ieki |
| 5,991,249 A | 11/1999 | Lee |
| 5,994,692 A | 11/1999 | Holzapfel |
| 6,094,307 A | 7/2000 | Ieki |
| 6,392,224 B1 | 5/2002 | Holzapfel et al. |
| 6,528,783 B1 | 3/2003 | Mortara et al. |
| 6,723,980 B2 | 4/2004 | Lee |
| 7,002,137 B2 | 2/2006 | Thorburn et al. |
| 7,067,797 B1 | 6/2006 | Mitchell et al. |
| 7,084,390 B2 * | 8/2006 | Mayer .................. 250/231.16 |
| 2001/0017349 A1 | 8/2001 | Holzapfel et al. |
| 2002/0008195 A1 | 1/2002 | Aoki et al. |
| 2003/0010906 A1 | 1/2003 | Lee |
| 2003/0047673 A1 * | 3/2003 | Thorburn et al. ...... 250/231.13 |
| 2003/0048536 A1 | 3/2003 | Aoki |
| 2003/0085345 A1 | 5/2003 | Franklin et al. |
| 2004/0046113 A1 | 3/2004 | Mayer et al. |
| 2005/0051716 A1 | 3/2005 | Mayer |

FOREIGN PATENT DOCUMENTS

| | | |
|---|---|---|
| DE | 195 05 176 | 8/1995 |
| EP | 0694764 | 1/1996 |
| WO | WO 03/021197 A1 | 3/2003 |

\* cited by examiner

OPTICAL ENCODER HAVING SLANTED OPTICAL DETECTOR ELEMENTS FOR HARMONIC SUPPRESSION

CROSS REFERENCE TO RELATED APPLICATIONS

This application is a continuation of U.S. application Ser. No. 11/189,551 filed Jul. 26, 2005, now abandoned.

BACKGROUND OF THE INVENTION

The present invention is related to the field of optical position encoders, and more particularly to optical position encoders employing techniques for suppressing undesirable harmonic components appearing in a periodic optical interference pattern within the encoder.

One general type of optical position encoder employs a source of coherent light, a diffraction grating that is movable with respect to the source, and a detector that is used to sample a pattern of interference fringes created by light from the source that is diffracted by the diffraction grating. As the grating moves with the object whose position is being measured, the pattern of interference fringes has an apparent motion by a proportional amount. The detector samples the pattern at a sufficient number of locations to create an estimate of the spatial phase of the interference fringes, which is readily convertible into an estimate of the position of the object.

In one common configuration, the optical encoder employs a so-called "four-bin" sampling and processing approach. It is assumed that the component of the fringe pattern in the direction of motion is substantially sinusoidal, which is accurate at least to a first approximation. The detector includes one or more sets of four discrete elements, and the elements of each set are arranged at 90 degree offsets from each other. The outputs of two of the elements that are separated by 180 degrees are combined to derive a value that is denoted the "sine" of the phase angle of the fringe pattern. Likewise, the outputs of the other two elements are combined to derive a value that is denoted the "cosine" of the phase angle. The position estimate is then derived as a value proportional to the arctangent of the ratio of the sine and cosine values. There are numerous variants that can be employed, including those employing other sampling arrangements such as three-bin or six-bin sampling.

In diffractive optical encoders, it is preferred that the fringe pattern be as sinusoidal as possible in order to avoid errors in the position estimate that necessarily occur when this assumption is not valid. There may be many sources of noise or other signal components that distort the fringe pattern from an ideal sinusoidal characteristic. One problem in particular is that of harmonic distortion, i.e., the presence of periodic components whose frequencies are an integer multiple of the fundamental frequency of the fringe pattern. Characteristics of the grating and/or other optical components in the encoder may introduce undesired harmonic distortion that can result in errors in position estimates. For example, encoders employing the so-called Talbot effect may have many diffractive orders that interfere at the detector to create complex fringe patterns with multiple harmonic components.

In many cases, any harmonic distortion appearing in the interference fringe pattern is filtered within a signal processor that receives the detector outputs. While this approach may be suitable in some applications, it may be difficult or impossible in others. Among other difficulties, such filtering may require an undesirably high amount of processing resources, which can lead to increased cost and other drawbacks.

It is known to use specially-designed detectors that tend to have less sensitivity to certain harmonic components of the interference fringe pattern. US Patent Application Publication 2003/0047673A1 of Thorburn et al., for example, shows a harmonic-suppressing optical detector in which the shapes, sizes and locations of individual optical detector elements are chosen such that the levels of certain harmonics, such as the third order harmonic, are reduced. In particular, the Thorburn et al. published application teaches detectors for suppressing third-order harmonics in which the widths of rectangular-shaped detector elements are equal to the spatial period T/3 of the third-order harmonic. As a result, the detector elements are insensitive to this particular component of the interference pattern, and thus the magnitude of this component in the detector output signal is very low in comparison to the magnitude of the fundamental component. The detector elements are arranged such that the four-bin processing can be performed.

U.S. Pat. No. 6,018,881 shows a magnetic position measurement system employing an oblique arrangement of magneto-resistive (MR) detector elements by which a third harmonic is filtered. The filtering reduces distortion caused by the highly non-linear response of the MR elements, which is due primarily to operation in so-called "saturation regions".

SUMMARY OF THE INVENTION

While encoders employing harmonic suppressing photodetector arrays such as shown in the Thorburn et al. published application can achieve good suppression of undesired harmonic components, they may not be suitable for all applications. In many cases, the harmonic component of most concern is the third-order component, because its magnitude may be substantially larger than that of higher-order odd harmonics such as the 5th, 7th, etc. However, the need for detector elements having a width of T/3 is to some extent inconsistent with a four-bin sampling approach. It is not possible to lay out four detector elements side-by-side that fit within one period of the fringe pattern and each have a width of T/3. In the Thorburn et al. published application, alternative layouts are utilized that generally involve distributing the detector elements from one set over multiple cycles of the fringe pattern, with suitable phase offsets. In alternative known schemes, the elements of each set are separated in the direction orthogonal to the direction of motion of the scale, so that for example only two elements of width T/3 are arranged side-by-side. While these layouts serve to accommodate the use of relatively wide detector elements in the context of four-bin sampling, they may have other drawbacks that might discourage their use in any particular encoder.

In the present disclosure, optical detectors are shown that exhibit harmonic suppression independently of their widths. The disclosed optical detectors employ a slanted orientation with respect to the interference fringes that serves to spatially integrate an undesirable harmonic component and thereby suppress its contribution to the output of the detector. As a result, the detectors can be arranged in a more flexible manner, such as to readily accommodate a four-bin sampling scheme.

In particular, the disclosed optical encoders generally include a source of a light beam and an optical grating disposed for motion relative to the light beam. The optical grating is operative in conjunction with the light beam to generate a spatial pattern of interference fringes at a detector location, the interference fringe pattern including an undesirable harmonic component. The encoders further include an optical detector at the detector location which includes a number of generally elongated detector elements that are operative to sample the interference fringe pattern at spatially separated locations along the direction of motion of the optical grating. Each detector element consists essentially of one or more slanted segments, and each slanted segment is slanted along the direction of motion of the optical grating by an integer multiple of the period of the undesirable harmonic component so as to spatially integrate the undesirable harmonic component and thereby substantially suppress its contribution to an output of the optical detector.

In more specific embodiments, the optical encoders employ a plurality of elongated rectangular detector elements that are substantially parallel to each other. Sub-types of these encoders include detectors in which the detector elements are arranged in a rectangular array, the entire rectangular array being rotated with respect to the direction of motion of the optical grating so as to impart the slant to the detector elements. Other sub-types include detectors in which the detector elements are arranged in a side-by-side fashion along the direction of motion of the optical grating so as to form a non-rectangular parallelogram.

In other embodiments, the disclosed optical encoders include detectors in which each detector element itself includes multiple elongated rectangular segments. In one sub-class, the segments are arranged parallel to each other in a manner roughly similar to a barber's pole. In another sub-class, the segments are arranged into two non-parallel sets. The two sets can be further arranged in an alternating fashion so as to impart a zig-zag or chevron shape to each detector element.

Detectors can also be employed that include both the slant feature (for reduction of one harmonic) and a width feature for reduction of either the same harmonic or a different harmonic, usually a higher-frequency harmonic. Thus for example a detector element might be slanted by an amount equal to T/3, which is the period of the third harmonic, and have a width of T/5 for suppression of the 5th harmonic.

Among the other benefits achieved by the disclosed optical encoder are improved alignment tolerance and greater tolerance of contamination during operation. These benefits arise in part from a "zig-zag" or repeated "chevron" shape of the optical detectors that extends over multiple cycles. The pattern provides for effective harmonic filtering over a relatively large range of rotational misalignment about the detector axis. Also, because of the natural redundancy of the repeated shape, the detectors can operate effectively even in the presence of small amounts of contamination that may block some segments.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
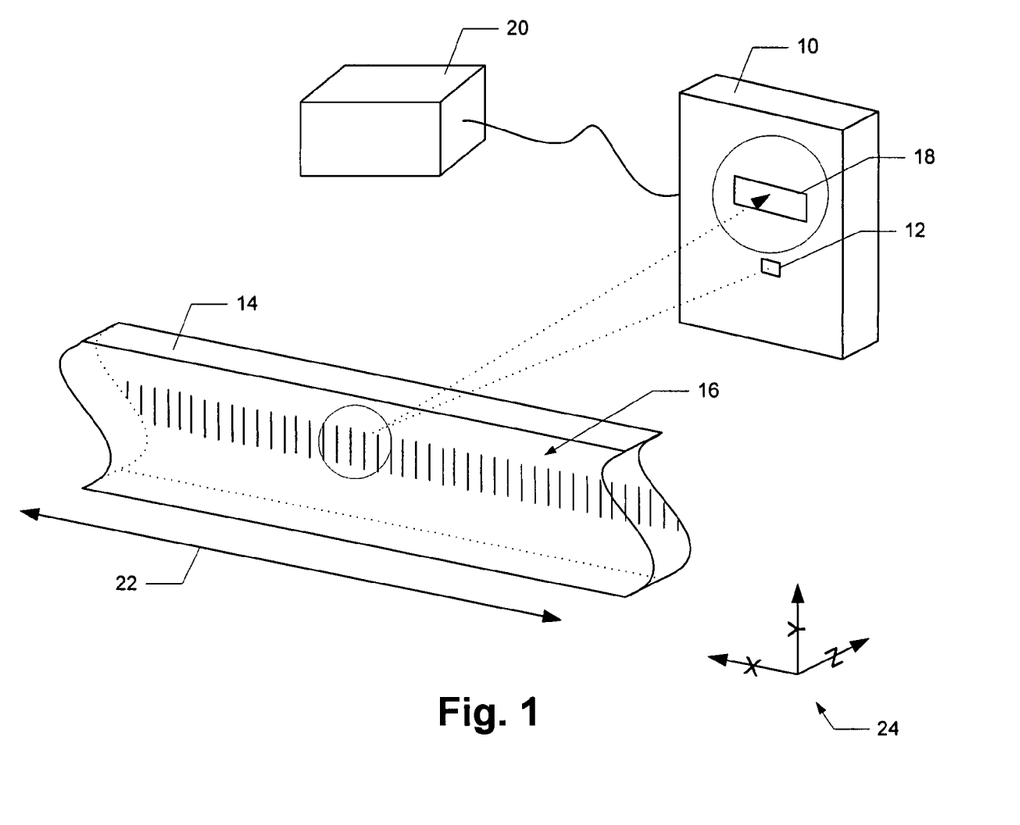
FIG. 1 is a schematic diagram of an optical encoder in accordance with the present invention.

In FIG. 1, sensor apparatus 10 is installed as part of a reflective, diffractive optical encoder. A source 12 illuminates a scale 14 on which a periodic, reflective diffraction grating 16 has been created. Light from the source 12 is reflectively diffracted from the scale 14 toward the sensor apparatus 10, which in the illustrated embodiment includes an optical detector 18. The diffraction grating 16 generates multiple orders of diffracted light which interfere with each other to form an optical fringe pattern (not illustrated) on the detector 18. The samples from the detector 18 are sent to an electronic processor 20 which calculates a fringe phase for each sample.

The fringe pattern is ideally a sinusoid characterized by a period P. Conceptually, when the scale 14 moves laterally relative to the detector 18 along the direction indicated by line 22, the fringe pattern moves a proportional distance on the face of detector 18. An accurate measurement of the changes in the phase of the fringe pattern is a proportional measurement of the movement of the scale 14. As discussed above, measurement errors can arise due to many reasons, including the presence of undesirable harmonic components in the fringe pattern. As described in more detail below, the detector 18 is configured in a manner that helps suppress the contribution of such undesirable harmonic components to the detector outputs that are provided to the processor 20.

For ease of reference, a set of coordinate axes 24 are shown to indicate directions of interest. The direction of motion 22 lies along the X axis. The scale 14 lies in a plane extending in the X and Y directions, with the individual elements of the grating 16 extending in the Y direction. The scale 14 and the sensor apparatus are separated in the Z direction. It will be appreciated that the interference fringe pattern incident on the detector 18 extends in both the X and Y directions, with the grating-created intensity variations in the X direction.

Figure 2:
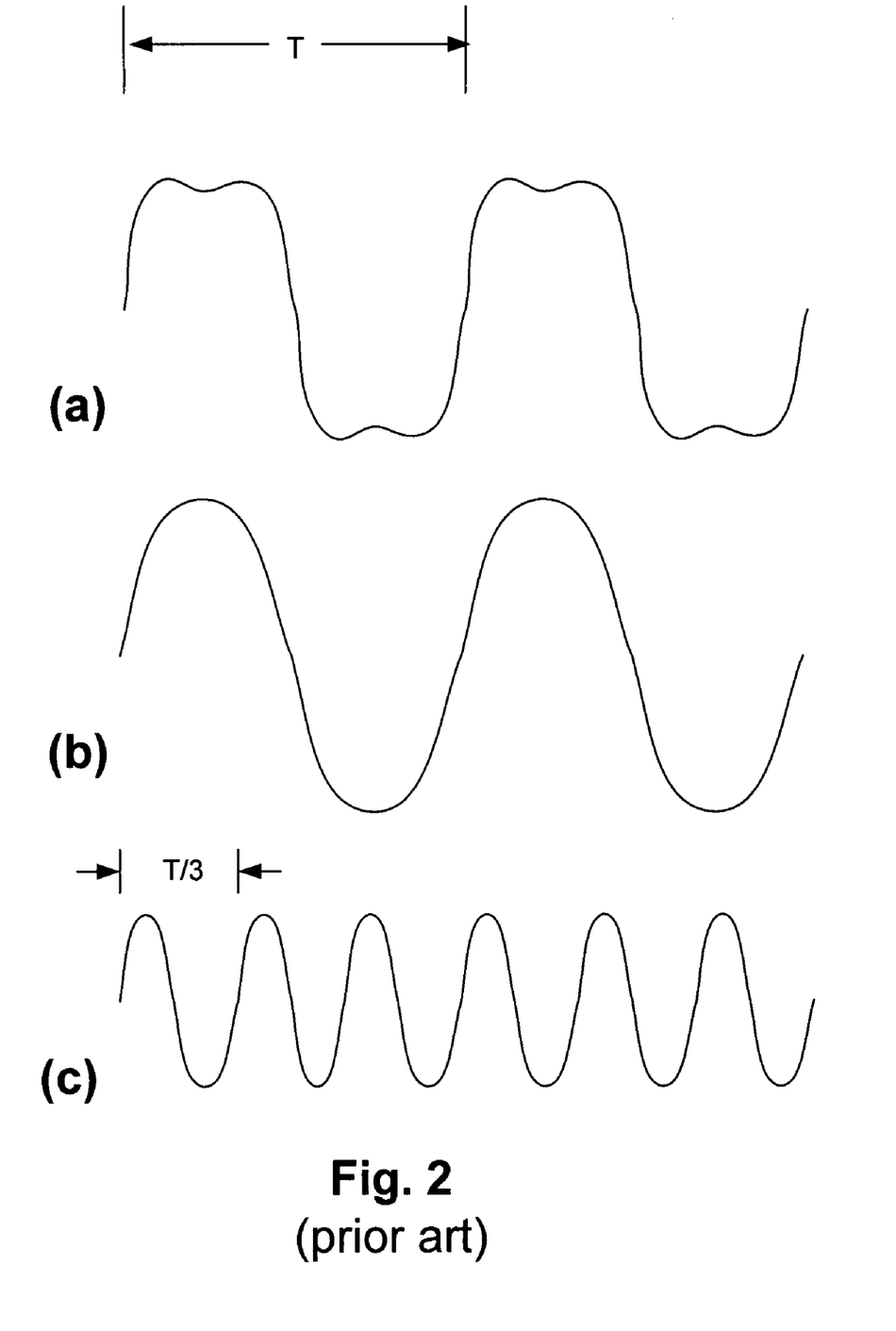
FIG. 2 is a waveform diagram of optical signals appearing in optical encoders as is known in the art.

FIG. 2 illustrates the problem addressed by the presently disclosed harmonic suppression technique in a somewhat exaggerated form. FIG. 2(a) shows an example intensity plot of a portion of an interference fringe pattern. The pattern has a definite period T as expected, but it also exhibits substantial harmonic distortion. FIGS. 2(b) and 2(c) show the fundamental and the third-order harmonic of this waveform, respectively, the period of the third-order harmonic being denoted T/3. For purposes of the present description, other harmonics are ignored. It is noted, however, that even-order harmonics are inherently suppressed in a four-phase sampling arrangement as described below, as well as in other sampling schemes. Thus, it is commonly the case that the suppression of odd-order harmonics is a problem remaining to be addressed in the design of optical encoders. The techniques disclosed herein are applicable to other odd-order harmonics, as well as to even-order harmonics if necessary. Also, the techniques disclosed herein may also be combined with other harmonic-suppression techniques to suppress multiple harmonic components if desired.

Figures 3, 4, 5:
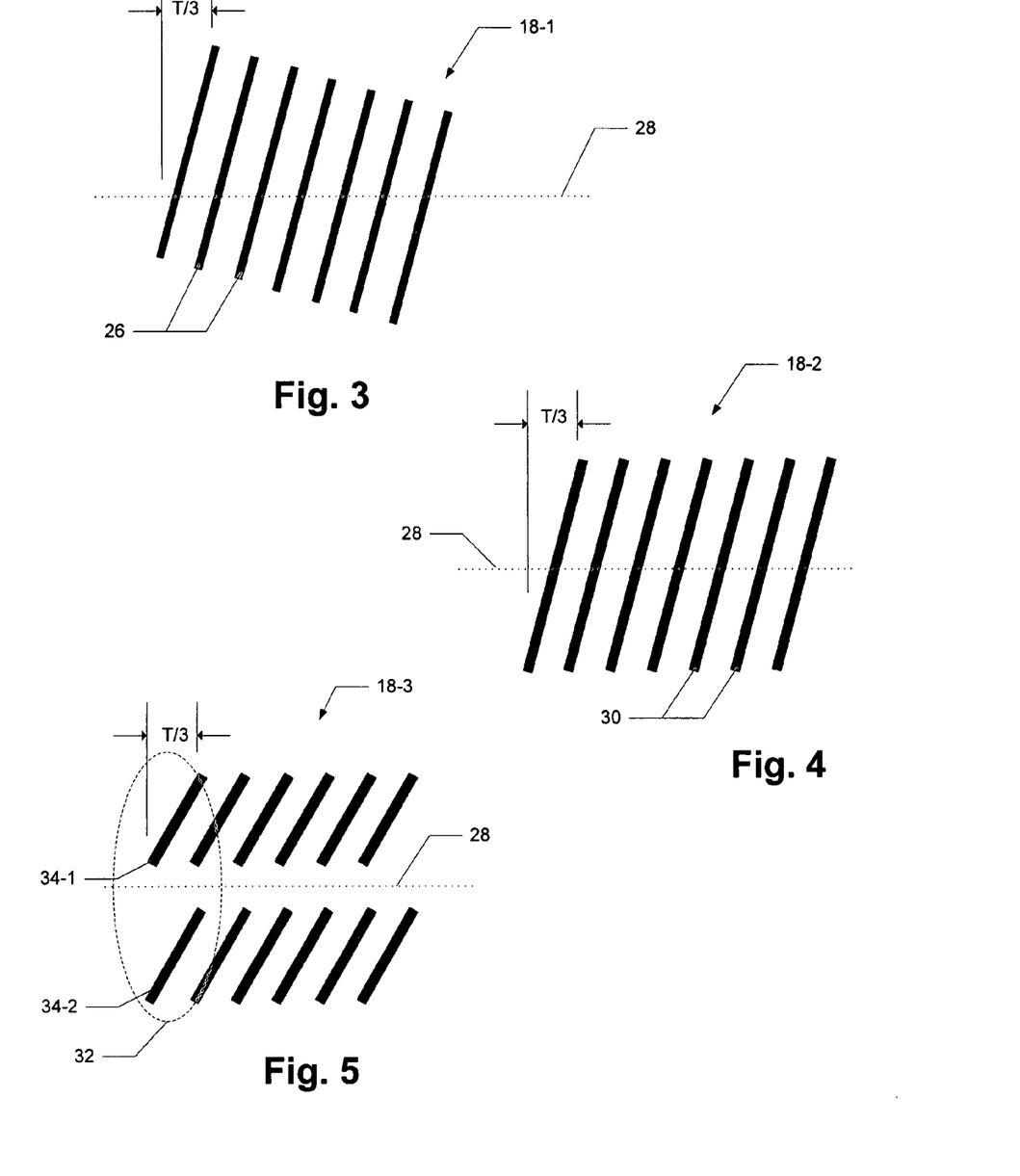
FIGS. 3-10 are diagrams depicting alternative embodiments of an optical detector in the optical encoder of FIG. 1.

FIG. 3 shows a first detector 18-1 that achieves suppression of a third-order harmonic component in an incident interference fringe pattern. The detector 18-1 includes a plurality of elongated rectangular photo-sensitive detector elements 26 (such as photodiodes) that are arrayed side-by-side. The entire array has a rectangular shape and is rotated such that the detector elements 26 are slanted at an angle with respect to a line 28 that represents the central portion of the interference fringe pattern in the X direction. The detector 18-1 is generally centered on the line 28 in the Y direction. The amount of rotation is such that each element 26 is slanted in the X direction by the period of the harmonic to be suppressed, in this example T/3. Thus, the amount of rotation is determined in part by the length of the detector elements 26. If the detector elements 26 are relatively long, then relatively little rotation is required to obtain the desired X-direction slant of T/3. More rotation is required if the detector elements 26 are relatively short. It will be appreciated that the detector 18-1 can be oriented as shown on a sensor apparatus that has a normal, non-rotated orientation about the Z axis. That is, in such an embodiment, an imaginary line between the source 12 (FIG. 1) and the center of the detector 18-1 lies along the direction of the Y axis, and the array of detector elements 26 is rotated with respect to that line. Alternatively, the detector elements 26 may be parallel to such a line, but this line is itself slanted with respect to the Y axis, i.e., the entire sensor apparatus 10 is rotated slightly about the Z axis.

In FIG. 3, the detector elements 26 are shown in an undifferentiated manner. However, as is known in the art, the detector elements 26 may be organized into a number of sets that sample the fringe pattern at different phases within one or more cycles. For example, four-phase sampling is commonly employed, which requires a detector element at each of 0, 90, 180 and 270 degrees in one or more cycles of the fringe pattern. Corresponding detectors from successive sets are electrically coupled together for spatial averaging and to obtain a higher-strength output signal. Such details are omitted from FIG. 3 (as well as the remaining Figures) in the interest of clarity.

The detector elements 26 are operated so as to have a substantially linear response characteristic, i.e., their respective electrical outputs are linearly related to the incident optical intensity. Thus, it will be appreciated that the response characteristic of the elements 26 does not itself substantially contribute to the presence of undesirable harmonic components in the detector output signals.

FIG. 4 shows an alternative detector 18-2. The detector elements 30 are slanted as in the detector 18-1 of FIG. 3, but are arranged side-by-side along the line 28 to form a non-rectangular parallelogram shape. In the detector 18-2, the slant or rotation is applied to the individual detector elements 30 rather than to the entire array as in the detector 18-1. Accordingly, the elements 30 all reside in the central part of the interference fringe pattern, yielding an overall higher signal strength. The detector 18-2 can be used in a conventional configuration in which the line connecting the source 12 with the center of the detector 18-2 extends parallel to the Y axis. A variant can be of a hybrid form in which the slant of the elements 30 is accomplished in part by rotation of the entire array (i.e., rotation of the sensor 10) and in part by slanting the individual detector elements on the sensor 10.

FIG. 5 shows a third alternative detector 18-3 in which each detector element 32 includes multiple disjoint segments 34 (34-1 and 34-2 as shown) that are arranged above and below the central line 28. For a given harmonic of interest, the shorter segments 34 can be provided with greater slant or tilt than the single-segment elements 26 and 30 of FIGS. 3 and 4. This can improve the tolerance of the detector 18-3 to misalignment. It will be appreciated that the segments 34-1 and 34-2 of each detector element 32 are electrically connected together or their outputs otherwise summed to form an output for the respective element 32.

Figure 6:
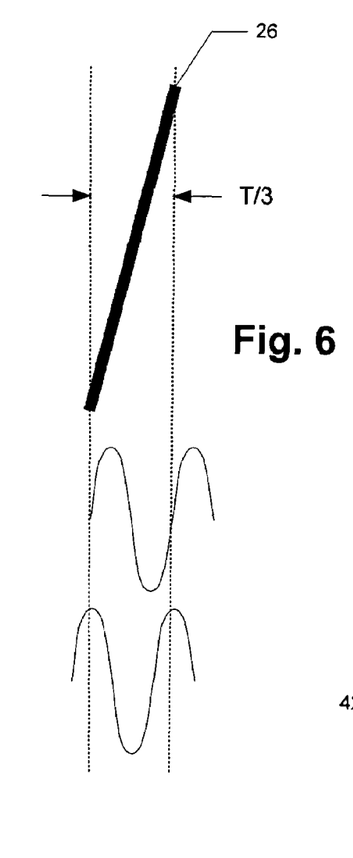

FIG. 6 illustrates the general principle by which the detectors disclosed herein (such as detectors 18-1, 18-2 and 18-3 described above) act to suppress the contribution of a harmonic component appearing in the interference fringe pattern. Shown in FIG. 6 are a detector element 26 and plots representing a third harmonic component of an interference fringe pattern at two arbitrary phases. As shown, in the X direction the pattern of the light intensity is substantially sinusoidal. In the Y direction, the light intensity is substantially uniform. A detector element such as an element 26 can be viewed as spatially integrating the pattern of incident light intensity over its surface area. With respect to the fundamental and other components of the incident light pattern, this spatial integration yields a value that varies as relative motion between the scale 12 and the sensor apparatus 10 occurs during operation. With respect to the third-order harmonic component, however, the output of the detector element stays constant notwithstanding the change of phase of this component as the scale 12 moves. Two arbitrary phases of this component are shown in FIG. 6. Regardless of the phase, the integral of one cycle of the third harmonic is a constant equal to the average value. Because the detector element extends exactly one cycle of the third harmonic in the X direction, its output for the third harmonic component of the light intensity pattern is substantially constant irrespective of the phase of the light pattern, and can therefore be filtered out by appropriate processing within the processor 20.

Figure 7:
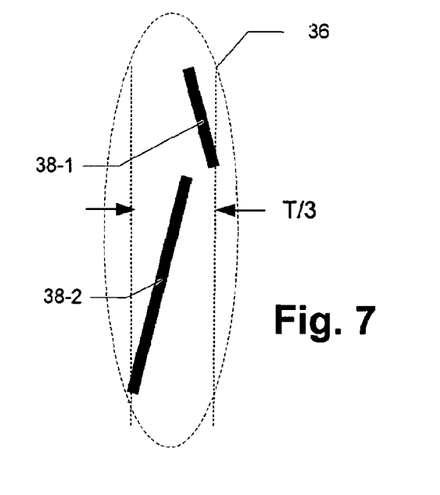

FIG. 7 shows a portion of an alternative embodiment in which a detector element 36 consists of multiple disjoint slanted segments such as segments 38-1 and 38-2 disposed within a given cycle of the harmonic of interest. In the illustrated embodiment, the segment 38-2 extends over approximately ⅔ of the harmonic cycle, and segment 38-1 extends over the remaining ⅓ of the cycle. It will be appreciated that the segments 38 are electrically connected together or otherwise summed, and that their summed outputs will reflect the spatial integral of the harmonic in a manner that is equivalent to that of the single slanted element 26.

Figure 8:
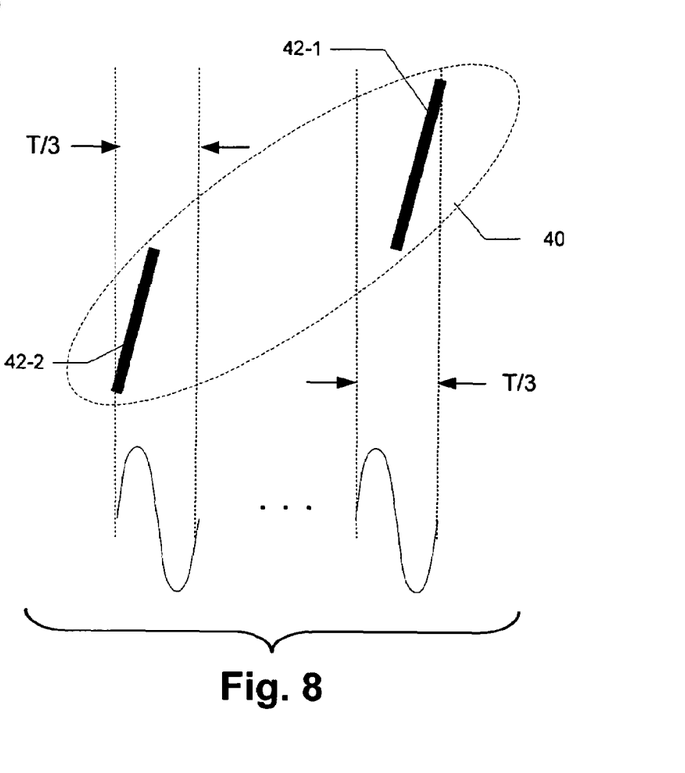

FIG. 8 shows another alternative embodiment in which a detector element 40 consists of slanted segments 42-1 and 42-2 similar to the segments 38-1 and 38-2 of FIG. 7, except that the segments 42-1 and 42-2 are in different cycles of the harmonic of interest. If the two segments 42-1 and 42-2 are within a region that is uniformly illuminated by the light from the source 12 (FIG. 1), then the detector element 40 likewise functions in a manner substantially equivalent to the element 26 of FIG. 6.

Figure 9:
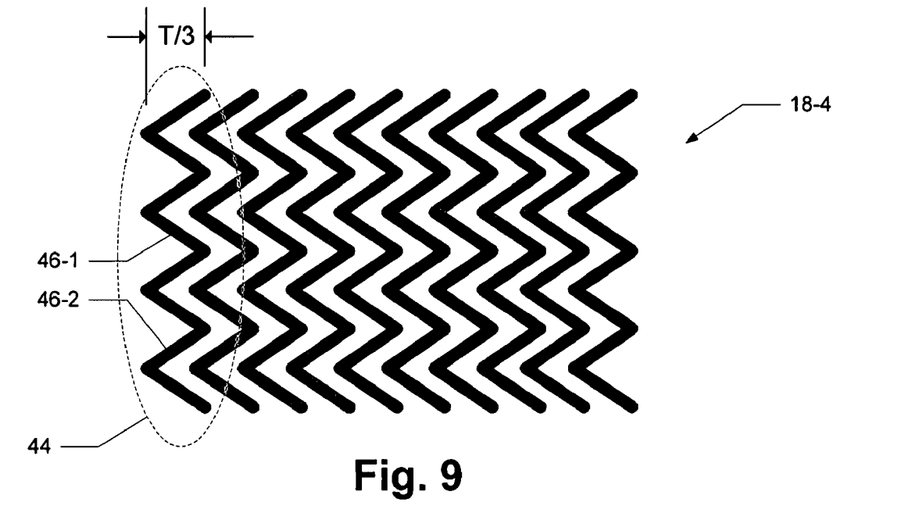

FIG. 9 shows a fourth alternative detector 18-4. Each element 44 of the detector 18-4 includes alternating segments 46-1 and 46-2 that are slanted in opposite directions, creating a multiple-cycle "zig-zag" or "chevron" shape. Each segment 46-1 is slanted in the X direction one way by the period of the harmonic of interest, such T/3 as shown, while each segment 46-2 is slanted in the opposite X direction by the same amount. It will be appreciated that each segment 46 achieves the spatial integration and thus suppression of the third harmonic as the elements 26, 30, 32, 36 and 42 described above. Additionally, the multiple-cycle chevron shape of the element 44 imparts at least one advantage over the shape of those other detectors. When a detector such as 18-1, 18-2 or 18-3 is employed, for example, the signal strength from the fundamental component is diminished due to a reduction of signal modulation caused by the slant of the elements away from the direction of the Y axis. This signal strength can be improved if the detector is rotated about the Z axis such that the elements are more aligned with the Y axis. Such rotation would tend to defeat the harmonic-suppressing feature of these detectors, of course, and would thus be undesirable from that perspective. Nevertheless, during the assembly and tuning of an encoder using such detectors, an unsophisticated assembler may mistakenly impart such rotation on the belief that higher signal strength is beneficial, oblivious to the degradation of signal quality caused by the presence of the third harmonic for instance.

This problem is avoided with the detector 18-4, because it achieves maximum signal strength and maximum harmonic suppression in the same orientation, due to the alternating directions of the segments 46-1 and 46-2. Any increase in signal strength from the segments 46-1 that would arise from rotation in one direction would be offset by a corresponding decrease from the segments 46-2, and vice-versa. This sensitivity to any Z-axis rotation away from this optimal orientation can actually be used as an aid in aligning the sensor apparatus 10 during assembly and tuning of the encoder.

Figure 10:
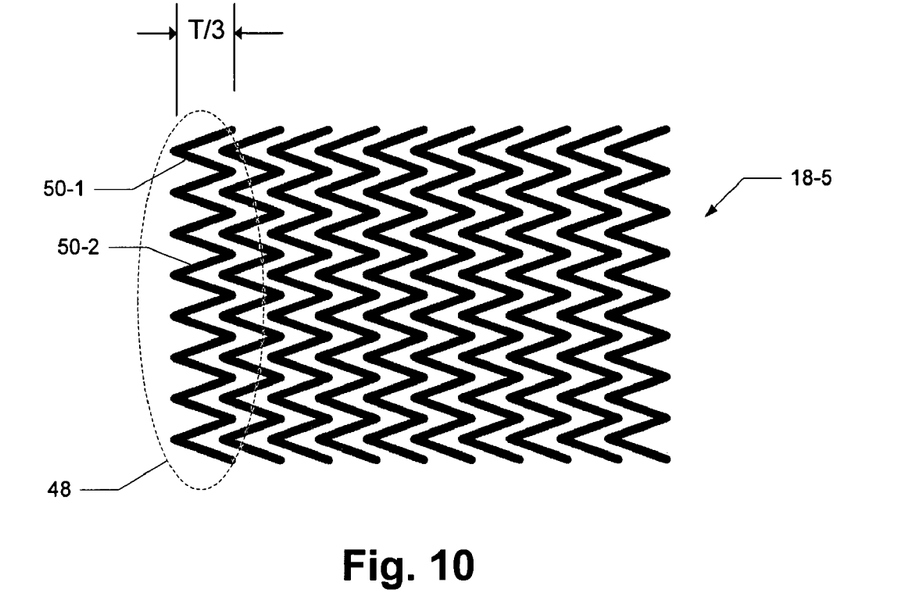

FIG. 10 shows an alternative detector 18-5 also employing chevron-shaped elements 48. The Y-axis pitch of the alternating segments 50-1 and 50-2 is greater than for the segments 46-1 and 46-2 of the detector 18-4. Generally, a higher-pitch detector such as detector 18-5 has the advantage of averaging many smaller segments and therefore is less sensitive to beam illumination irregularities. A higher pitch detector may also have advantages with respect to encoder alignment. However, difficulties may also arise that impose practical limits. These include the relatively sharp "corners" where two segments 50-1 and 50-2 meet, which may be difficult to accurately create in the detector manufacturing process. Additionally, a higher-pitch detector may have greater or lesser sensitivity to any variations in the Y-axis component of the incident light pattern. These aspects of the chevron shape may influence the selection of a value for the pitch in any particular embodiment.

In the detectors described above, the width of the detector elements does not bear any necessary relationship to the period of either the harmonic component that is being suppressed or of any other harmonic component. Indeed, this independence from element width can be very advantageous, by enabling the design of relatively small detectors with closely spaced elements that achieve a desirable degree of harmonic suppression. However, it may be possible to employ a particular width for the detector elements 26 in order to obtain additional harmonic suppression. In particular, it may be advantageous to employ detector elements having an amount of X-axis slant related to the period of one harmonic and having an X-axis width related to the period of a higher-order harmonic. For example, in the detectors 18-1 through 18-5 that have a slant of T/3, their respective widths can be set to T/5 or T/7 for suppression of fifth-order or seventh-order harmonics. With such a configuration, it may still be possible to fit four detector elements within a single period of the fundamental, resulting in a desirable compactness in the detector layout. In an alternative embodiment, it may be desirable to make the width of each element equal to or greater than the amount of slant, for example to make the width of each element in detector 18-1 equal to some multiple of T/3.

Although the foregoing description is of a diffractive, reflective encoder, it will be apparent to those skilled in the art that the disclosed techniques can be employed in many other optical encoder types. The disclosed techniques may generally be employed in all types of optical encoders including the following: diffractive and geometric encoders as well as moiré-based encoders, reflective and transmissive encoders, encoders having additional optics (e.g., collimators, apertures, diffractive beam correctors, prisms, lenses, polarizing optics etc.) and encoders without such additional optics (e.g., Talbot encoders), rotary and linear encoders, encoders using secondary or intermediate masks, and encoders using LED light sources rather than laser sources. Additionally, it is not necessary that the various segments of each element of the detector be of the same length or be parallel to each other. The important characteristic is that the slant of the detector elements be equal to an integer multiple of the period of the harmonic of interest.

What is claimed is:

1. An optical encoder, comprising:
   a source of a light beam;
   an optical grating disposed for motion relative to the light beam, the optical grating being operative in conjunction with the light beam to generate a spatial pattern of interference fringes at a detector location, the interference fringe pattern including an undesirable harmonic component; and
   an optical detector at the detector location, the optical detector including a plurality of elongated detector elements operative to sample the interference fringe pattern at spatially separated locations along the direction of relative motion of the optical grating, each detector element comprising one or more segments each slanting across the interference fringe pattern by an integer multiple of the period of the undesirable harmonic component so as to spatially integrate the undesirable harmonic component in a manner substantially suppressing its contribution to a position-dependent output of the optical detector.

2. An optical encoder according to claim 1, wherein each detector element comprises one elongated segment, and wherein the respective segments of the detector elements are substantially parallel to each other.

3. An optical encoder according to claim 2, wherein the segments of the detector elements are arranged in a rectangular array, the entire rectangular array being rotated with respect to the direction of motion of the optical grating so as to impart a slant to the segments of the detector elements.

4. An optical encoder according to claim 2, wherein the segments of the detector elements are arranged in a slanted side-by-side fashion to form a non-rectangular parallelogram.

5. An optical encoder according to claim 4, wherein the parallelogram is non-rotated with respect to the direction of motion of the optical grating.

6. An optical encoder according to claim 4, wherein the parallelogram is rotated with respect to the direction of motion of the optical grating.

7. An optical encoder according to claim 1, wherein each detector element includes multiple elongated segments.

8. An optical encoder according to claim 7, wherein the elongated segments of each detector element are parallel to each other.

9. An optical encoder according to claim 7, wherein the elongated segments of each detector element include a plurality of segments not parallel to each other.

10. An optical encoder according to claim 9, wherein the elongated segments of each detector element are arranged into two non-parallel sets.

11. An optical encoder according to claim 9, wherein the elongated segments of each detector element are arranged in an alternating fashion so as to impart a multiple-cycle, zig-zag shape to each of the detector elements.

12. An optical encoder according to claim 11, wherein the elongated segments of each detector element are arranged into two non-parallel sets.

13. An optical encoder according to claim 1, wherein each elongated detector element has a width substantially less than the amount by which the detector elements are slanted.

14. An optical encoder according to claim 1, wherein the undesirable harmonic component is a first undesirable harmonic component, the interference fringe pattern includes a second undesirable harmonic component, and each elongated detector element has a width substantially equal to an integer multiple of the period of the second undesirable harmonic component.

15. An optical encoder according to claim 14, wherein the second undesirable harmonic component is of higher frequency than the first undesirable harmonic component.

16. An optical encoder according to claim 1, wherein each elongated detector element has a width greater than the amount by which the detector elements are slanted.

17. An optical encoder, comprising:
a source of a light beam;
an optical grating disposed for motion relative to the light beam, the optical grating being operative in conjunction with the light beam to generate a spatial pattern of interference fringes at a detector location, the interference fringe pattern including an undesirable harmonic component; and
an optical detector at the detector location, the optical detector including a plurality of elongated detector elements operative to sample the interference fringe pattern at spatially separated locations along the direction of relative motion of the optical grating, each detector element comprising a plurality of slanted, non-adjoining segments collectively extending across the interference fringe pattern by an integer multiple of the period of the undesirable harmonic component so as to spatially integrate the undesirable harmonic component in a manner substantially suppressing its contribution to a position-dependent output of the optical detector.

18. An optical encoder according to claim 17, wherein the segments of each detector element are located within a respective single cycle of the interference fringe pattern.

19. An optical encoder according to claim 17, wherein the segments of each detector element are located in respective different cycles of the interference fringe pattern.

20. An optical encoder according to claim 17, wherein the segments of each detector element are parallel.

21. An optical encoder according to claim 17, wherein the segments of each detector element are non-parallel.

22. An optical encoder, comprising:
a source of a light beam;
an optical grating disposed for motion relative to the light beam, the optical grating being operative in conjunction with the light beam to generate a spatial pattern of interference fringes at a detector location, the interference fringe pattern including an undesirable harmonic component; and
an optical detector at the detector location, the optical detector including a plurality of elongated detector elements operative to sample the interference fringe pattern at spatially separated locations along the direction of relative motion of the optical grating, each detector element comprising multiple elongated segments including a plurality of segments not parallel to each other, each elongated segment slanting across the interference fringe pattern by an integer multiple of the period of the undesirable harmonic component so as to spatially integrate the undesirable harmonic component in a manner substantially suppressing its contribution to a position-dependent output of the optical detector.

23. An optical encoder according to claim 22, wherein the elongated segments of each detector element are arranged into two non-parallel sets.

24. An optical encoder, comprising:
a source of a light beam;
an optical grating disposed for motion relative to the light beam, the optical grating being operative in conjunction with the light beam to generate a spatial pattern of interference fringes at a detector location, the interference fringe pattern including an undesirable harmonic component; and
an optical detector at the detector location, the optical detector including a plurality of elongated detector elements operative to sample the interference fringe pattern at spatially separated locations along the direction of relative motion of the optical grating, each detector element comprising multiple elongated segments arranged in two non-parallel sets in an alternating fashion so as to impart a multiple-cycle, zig-zag shape to each of the detector elements, each segment of each detector element slanting across the interference fringe pattern by an integer multiple of the period of the undesirable harmonic component so as to spatially integrate the undesirable harmonic component in a manner substantially suppressing its contribution to a position-dependent output of the optical detector.

* * * * *